Aug. 30, 1932.  W. E. BURNS  1,874,887
CAN MAKING AND APPARATUS
Filed Jan. 27, 1928   2 Sheets-Sheet 1

INVENTOR.
Wilford E. Burns
BY Miller & Boyken
ATTORNEYS.

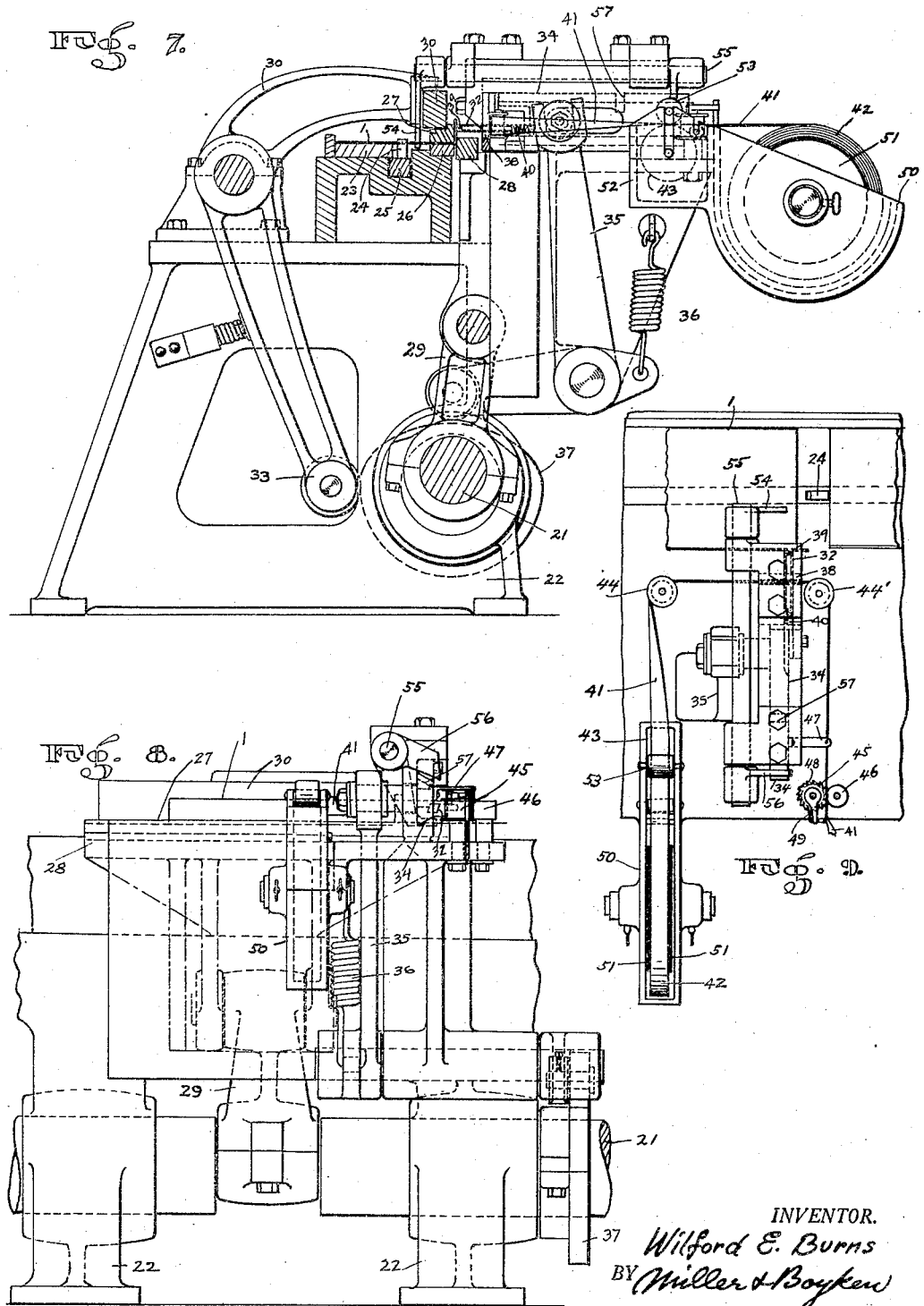

Patented Aug. 30, 1932

1,874,887

UNITED STATES PATENT OFFICE

WILFORD E. BURNS, OF BURLINGAME, CALIFORNIA, ASSIGNOR TO M. J. B. CO., OF SAN FRANCISCO, CALIFORNIA, A CORPORATION OF DELAWARE

CAN MAKING AND APPARATUS

Application filed January 27, 1928. Serial No. 250,030.

This invention refers to can making and the type of so-called tin can wherein a circumferential tearing strip is provided for releasing one end of the can, and particularly to such a can as shown in my issued Patent #1,615,930 and copending application filed under Ser. No. 173,460 wherein the tearing strip is defined by score lines on the outer layer of a triple layer of metal extending as a band around the can adjacent one end thereof.

The objects of the invention are to provide an improved method of folding the can blank to form the triple layer, and to a method of preventing the solder used on the body joint from spreading excessively between the layers forming the band with consequent soldering of the layers together so that the tearing strip is hard to remove, or to prevent any objectional spreading of the solder at any point on a can whether formed with a triple layer band of metal as described or not, also to a can made by my method, and to the apparatus for making the same.

Since a can with the triple layer band and tearing strip has been described in detail in my Patent #1,615,930 and my copending case, and the description is lengthy, the present application will be much shortened by referring to said patent and copending case for a fuller description of the can, and especially to the figures of the drawings of both cases showing, first the flat can blank, second the blank folded to form the triple layer, and third the folded blank formed into the tubular can body with vertical body seam locked.

In the drawings accompanying the present application Figs. 1, 2, 3 and 4 are end edge views of the sheet tin can blank as successively folded in accordance with my method to produce the triple layer band mentioned.

Fig. 7 is an end elevation and section of apparatus for folding the blank to form the triple layer band and for inserting antisolder spreading means at a point on the metal so as to ultimately come between the folds of the band.

Fig. 8 is a side elevation of Fig. 7, and Fig. 9 is a plan view of portion of the apparatus of Figs. 8 and 9.

Figure 1:
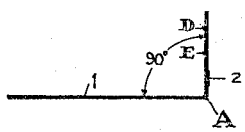

In the manufacture of a can of the character described considerable difficulty has been met both in forming the triple layer of metal rapidly and accurately on automatic machinery, and also in preventing the layers of tin from soldering together over an area extending laterally from the vertical seam of the can, which effect sometimes makes it difficult to tear off the scored tearing strip.

After considerable experimentation with various folding steps and continuous progressive folding of the blank through suitable forming guides and rollers to form the triple layer I have evolved a method comprising four stages which may be carried out on automatic machines, and in which stages the blank 1 is successively folded to the forms shown respectively in Figs. 1 to 4, and to prevent the objectional spreading of the solder within the folds I apply a solder opposing substance at a point 2 on the blank adjacent one or both ends thereof after the first folding step.

I have experimented with various substances applied at the point mentioned, such for instance as paint, varnish, printing ink, etc. and while several of these were quite effective, I found the best results were obtained by gumming or otherwise inserting a small paper patch at such points between the layers where solder was objectional.

The paper used is thin and does not interfere with the usual automatic operations on the body machine preparatory to passage of the formed body over the soldering horn.

Since the usual operations of tin can making and the machines used therefor are well understood by those versed in the art, no needless explanation of such machines or operations will be attempted herein, but it will suffice to say that prior to reaching the body machine wherein the can blanks are intermittently advanced and stopped at succeeding stages for folding the lock seam, forming the body, locking, and closing the seam, I advance the died-out and scored blanks; through means of a standard body machine feed; intermittently along a guide (which may be an extension of the body machine guide or a separate machine feeding into the body machine) and stop the blanks at stages along the guide for successively bending or folding one long margin of the blank to the positions shown in Figs. 1, 2, 3 and 4.

In Fig. 7 a representative portion of the machine used for carrying out the operations is shown and in which 21 is a main power or cam shaft from which all moving parts are positively driven by any of the well known means not shown so that all operations will register with the blanks as they are intermittently advanced from stage to stage.

This shaft 21 is rotatably mounted on frame members 22 suitably spaced along the machine, and supported on these frame members is a guide 23 along which the can blanks 1 are intermittently advanced from stage to stage through means of any suitable type of intermittent feeding mechanism such as the spring hooks or pawls 24 mounted on the bar 25 reciprocated the required distance of travel by any suitable transmission connections to the shaft 21, as well understood in the art, and therefore not shown on the drawings.

At the different stages represented by Figs. 1, 2, 3, 4 the margin of the metal sheet or blank 1 passes between suitably shaped jaws as at 26—27 for stage 1 between which it is clamped while a brake jaw 28 moved by cam or crank connection 29 to the shaft 21 folds the margin to form one of the steps of forming the triple layer band which will extend around the completed can body.

In this apparatus the blank is clamped by slight downward movement of arm 30 which carries the upper jaw 27, the movement being effected by any suitable cam connection to shaft 21 indicated at 33 and therefore timed with the feed and brake movements.

Brake jaw 28 is here shown as sliding though it is understood that at this stage or at any of the other stages the folding jaw may be pivoted like any common sheet metal brake, whichever arrangement best serves the layout of the machine or angle to which the sheet is to be bent.

Figure 2:
Figure 3:
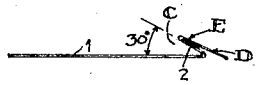
Figure 4:

The first stage operation described results in an upward right angle fold of the margin as shown at A in Fig. 1, and after which the sheet is advanced and stopped at stage 2 whereat a similar arrangement of elements folds the upstanding wall downward and outward at an angle of substantially 45 degrees as at B in Fig. 2, after which the blank passes to stage 3 where the bends are closed in a direction toward the flat sheet of the body to about 30 degrees as at C in Fig. 3, and at the last stage the folds are flattened down against the main body of the sheet so as to form with it a triple layer of metal the length of the blank with the score lines D, E for the tearing strip positioned on the under side of the outer sheet at points shown in Fig. 4 so that the tearing strip will eventually be on the outer layer of the band when the can is complete.

Figure 5:
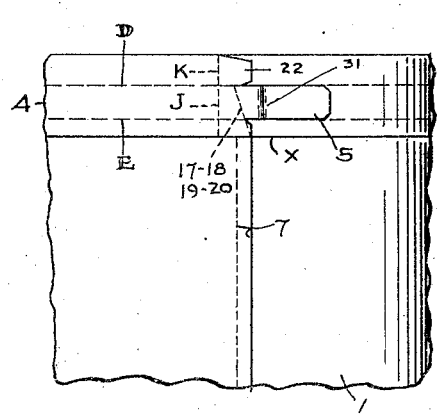
Fig. 5 is a portion of Fig. 7 of my copending case bearing same reference figures for identification therewith and shows in elevation the body of the can at the vertical joint.
Figure 6:
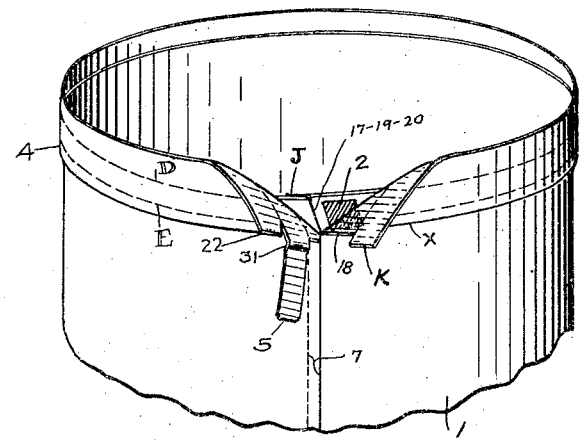
Fig. 6 is a perspective view of the same part of the can shown in Fig. 5 with the upper corners of the outer layer of metal bent downward to expose the joint within the triple layer portion.

In dieing out the can blank it is formed to provide a freely projecting tongue 5 extending in line with the tearing strip score lines D, E adapted for engagement with a key for winding or tearing off the tearing strip in the common manner and one of the present improvements consists of outwardly offsetting this tongue from the point 31 in Figs. 5 and 6 about a thirty-second of an inch thereby preventing capillary attraction of the solder under the tongue at the time of soldering which otherwise spreads the solder to the right of the vertical seam too far under the tongue.

However the tearing strip itself being the outer layer of the triple layer of metal invites capillary attraction of the solder along its under surface, and which effect is especially troublesome near the final end of the strip.

To limit the creeping action of the hot solder at such points between the layers of metal where objectionable I preferably apply the paper patch previously mentioned.

Fig. 6 shows the corners of the outer layer 4 of metal bent down at the body joint 7 showing one of my paper patches 2 in position so as to be under the rear end of the tearing strip.

This patch 2 is preferably applied at stage 1 of the margin folding operations by the mechanism shown in Figs. 7, 8 and 9 and wherein a reciprocating punch 32 cuts out a patch of gummed paper from a tape 41 and forces it against the upturned margin as soon as the brake jaw 28 falls sufficiently to clear the punch. This punch is of a shape to cut out the form of patch desired and is mounted on a slidable carriage 34 reciprocated in proper time with the brake jaw 28 by means of an oscillary crank arm 35 which normally is forced forward by a spring 36 and backward by a cam 37 on the main shaft 21. The shape and setting of the cam being such that cam holds the punch withdrawn and clear of the brake jaw until the jaw has formed the right angle bend to the can blank and fallen to clear the punch and at which time the cam 37 falls away to permit spring 36 to force the punch forward.

The punch operates through a die plate 38 and the punch is hollow and carries a centering point 39 resiliently forced forward by a light spring 40.

The gummed paper strip or tape 41 is carried on a supply roll 42 from which it is led over a moistening roll 43, given a quarter turn and passed over idler 44 and behind the die plate, thence over a similar idler 44' and back between a pair of intermittent feed rollers 45—46 which advance the paper strip at each return stroke of the punch.

The advancing rollers are actuated by a pin 47 projecting from the punch carriage 34 and engaging ratchet teeth 48 on one of the rolls. A spring pawl 49 is provided to prevent reversal of the rolls.

The paper supply roll 42 is carried in a receptacle 50 and which receptacle is provided with smooth disks 51 which may be adjusted against the sides of the roll to develop a proper working friction and which disks also overcome any necessity of finishing the inner side walls of the receptacle.

The moistening roll 43 idles in a water trough 52 and a small idler 53 lies freely on top of the paper as it passes over the moistening roll.

Gummed paper is preferably used for the paper strip, though it should be noted that the folding operations at stages 1, 2, 3, 4 follow so quickly that some grades of ungummed paper simply moistened with water will stick sufficiently so that the patch will remain in place long enough to be folded into place between the layers of tin, and after which it will not shift.

Also is should be noted that if desired the paper may be omitted and the end of a plain punch inked so as to impress an ink spot on the sheet at the point desired, but I prefer the paper as it forms a more effective solder barrier than any ink, paint or varnish which I have tried.

A trip is provided to prevent the punch working in case no blanks are passing through the machine and which includes a depending lever 54 normally riding on the blanks as they come along and formed to overlap the space between the blanks (about an inch). This lever is secured to a horizontal shaft 55 which carries a dog 56 in line to swing into a groove 57 formed in the sliding punch carriage when the same is drawn all the way back by the cam 37.

If no blank is in place to support the trip lever 54 it will fall and the dog 56 will lock the carriage in inoperative position until a blank comes along and lifts the lever.

Having thus described my improvements in can manufacture it will be seen to comprise the insertion of a solder barrier between certain layers of tin, and a method of folding the metal in stages permitting of applying the solder barrier, also a can incorporating the novel features claimed whereby the tearing strip is provided with a limited soldered area so that its subsequent free removal is assured, and finally the special apparatus whereby the combined method steps are carried out.

I claim:

A sheet metal can body blank having a fold formed by overlapped contacting layers of metal, the opposite ends of the blank being designed subsequently to be joined together in a soldering seam; said fold including a tearing strip in the outer layer thereof and a paper insert applied between the layers of the fold at a point adjacent one end of the blank to prevent objectionable spreading of solder along the tail end of the tearing strip when the ends of the blank are joined in the seam and to limit the soldering area along the strip to insure subsequent easy removal thereof.

WILFORD E. BURNS.